US008865011B2

(12) United States Patent
Philip et al.

(10) Patent No.: US 8,865,011 B2
(45) Date of Patent: Oct. 21, 2014

(54) METHOD FOR OPTIMIZING THE SPECTRAL PERFORMANCE OF SCINTILLATOR CRYSTALS

(75) Inventors: Olivier G. Philip, Ewing, NJ (US); Markus Berheide, Medford, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 240 days.

(21) Appl. No.: 13/321,547

(22) PCT Filed: May 18, 2010

(86) PCT No.: PCT/US2010/035217
§ 371 (c)(1),
(2), (4) Date: Apr. 12, 2012

(87) PCT Pub. No.: WO2010/135298
PCT Pub. Date: Nov. 25, 2010

(65) Prior Publication Data
US 2012/0187081 A1    Jul. 26, 2012

Related U.S. Application Data

(60) Provisional application No. 61/179,916, filed on May 20, 2009.

(51) Int. Cl.
*C03C 15/00*    (2006.01)
*G01T 1/20*    (2006.01)

(52) U.S. Cl.
CPC .................................. *G01T 1/2002* (2013.01)
USPC . 216/58; 250/374; 250/390.025; 250/390.03; 250/393

(58) Field of Classification Search
USPC ........... 216/58; 250/374, 390.02, 390.03, 393
See application file for complete search history.

(56) References Cited

U.S. PATENT DOCUMENTS

| 3,102,955 | A | | 9/1963 | Carlson |
| 3,825,758 | A | * | 7/1974 | Miraldi ......................... 250/366 |
| 5,866,908 | A | | 2/1999 | Novak |
| 6,865,787 | B2 | * | 3/2005 | Shingai et al. .................... 29/28 |
| 7,692,156 | B1 | * | 4/2010 | Nagarkar ................. 250/370.11 |

(Continued)

FOREIGN PATENT DOCUMENTS

| EP | 2433153 A2 | 3/2012 |
| JP | H03150488 A | 6/1991 |

(Continued)

OTHER PUBLICATIONS

Kurashige K, et al. IEEE Transacations on Nuclear Science, vol. 45, No. 3, Jun. 3, 1998. pp. 522-524.*

(Continued)

*Primary Examiner* — Lan Vinh
*Assistant Examiner* — Maki Angadi
(74) *Attorney, Agent, or Firm* — Jeremy Berman

(57) ABSTRACT

The invention provides a method for optimizing the spectroscopy performance of a spectroscopy scintillator by surrounding the scintillator by a reflector material, performing a scan measuring resolution and light output at three or more axial locations on the crystal, where at least one location is close to the PMT or below the crystal (near the PMT) at least one location is at the end away from the PMT of the scintillator), and adjusting the surface finish of the crystal and/or the reflector to obtain equal light output and optimal resolution over the length and different azimuth of the crystal.

33 Claims, 8 Drawing Sheets

(56) References Cited

U.S. PATENT DOCUMENTS

| | | |
|---|---|---|
| 8,143,582 B2* | 3/2012 | Fruehauf et al. .......... 250/361 R |
| 2005/0139776 A1 | 6/2005 | Reiter |
| 2010/0171957 A1* | 7/2010 | Van Nijnatten et al. ...... 356/445 |
| 2010/0243878 A1* | 9/2010 | Freiburger et al. ........ 250/252.1 |
| 2012/0187081 A1 | 7/2012 | Philip et al. |
| 2013/0075617 A1 | 3/2013 | Simonetti et al. |

FOREIGN PATENT DOCUMENTS

| | | |
|---|---|---|
| JP | 06005297 B2 | 1/1994 |
| JP | H06082561 A | 3/1994 |
| JP | 2005-512064 A | 4/2005 |

OTHER PUBLICATIONS

International Preliminary Report on Patentability dated Dec. 1, 2011 for corresponding PCT Application No. PCT/US2010/035217 filed May 18, 2010.

JP Notification of Reason for Refusal for Japanese Application No. 2012-511951 dated Jun. 11, 2014.

\* cited by examiner

METHOD FOR OPTIMIZING THE SPECTRAL PERFORMANCE OF SCINTILLATOR CRYSTALS

RELATED APPLICATIONS

The present application claims priority to U.S. Provisional Patent Application Ser. No. 61/179,916 filed May 20, 2009.

BACKGROUND

Nuclear gamma-ray spectroscopy is a technique used to analyze nuclear radiation detected in a radiation detector. When doing a spectral analysis, the nuclear radiation is detected using a nuclear detector. The detector information is recorded into a spectrum, which is a histogram of the different nuclear energies recorded and their rate of detection. The analysis of the gamma-ray spectrum makes it possible to identify the composition of a sample being studied and to determine the quantity of the different elements that compose the sample.

Nuclear gamma-ray spectroscopy techniques are used in many fields including oilfield exploration applications such as wireline logging, logging while drilling, and the like. In oilfield applications, the nuclear spectroscopy technique is for example used to analyze the geochemical composition of a formation around a well for evaluation in the search for hydrocarbons.

One type of radiation detector commonly used for nuclear spectroscopy is a scintillation detector comprised of a scintillating crystal and a photomultiplier tube (PMT) or other device suitable for converting the scintillator light signal into an electric signal. The scintillating crystal is a material that has the property to convert nuclear radiation into optical radiation, or light, that has a wavelength to which the photomultiplier tube is sensitive.

The total signal, i.e. in the case of a scintillation detector the total number of photons, is a function of the amount of energy deposited by the nuclear radiation and of the photon conversion efficiency of the scintillator. This combined function is the response function. For good spectroscopy performance it is essential that the conversion ratio of deposited energy to the number of photons be independent or almost independent of the deposited energy.

An important factor in the quality of the nuclear spectroscopy analysis is the ability of the scintillation crystal to produce consistently the same quantity of light for the same amount of deposited energy. In theory, the detector response to a single energy of nuclear radiation is driven by statistical processes in the energy conversion from photons to electrons and can be approximated by a Gaussian spectral shape; the narrower the Gaussian width, the higher the quality of the spectral data. The width of the peak is quantified by a parameter called "resolution:" for a given scintillator material the better the resolution, the higher the quality of the detector. In theory, assuming that the light output is proportional to the deposited energy, the width of the Gaussian, or resolution, varies with the square root of the energy deposited by the nuclear particles being detected. In reality, the detector's single energy response is not always Gaussian and the width of the response does not always follow the square root of energy. E.g. resolution may depend on the location of impact of the incoming gamma-ray in the detector volume, as either different amounts of light are created in different parts of the crystal or the light collection varies from location to location. Such imperfect behavior is detrimental to the quality of the data obtained with nuclear spectroscopy.

Scintillation crystal compensation is the process where the crystal surface is modified to improve the response function of a detector. This process is widely known in its basic form. Saint Gobain Crystals and Detectors publish the fact (Technical information note Document #526) that the surface of their scintillator crystals is roughened on all surfaces except the surface coupled to the PMT to avoid trapping light in the crystal through total reflection.

U.S. Pat. No. 5,866,908 describes how the reflector properties for individual crystals in scintillator arrays can be modified to obtain a more uniform output level throughout the sensor. Thus, the prior art describes methods to affect detector response level, but not the shape of the detector spectral response or the behavior of the detector response throughout a range of nuclear energy.

Nuclear gamma-ray spectroscopy is used currently in at least three oilfield tools marketed by Schlumberger and other companies are starting to produce their own tools as well. The Schlumberger Wireline Reservoir Saturation Tool (RST) acquires gamma-ray spectra from neutron interactions to produce its answer products. The Wireline Elemental Capture Spectroscopy sonde (ECS) is another tool that analyzes gamma-ray spectroscopy data from neutron interactions. Finally, the EcoScope™ tool provides gamma-ray spectroscopy answer products in logging while drilling. All of these tools' performance is negatively affected when the detector response is not Gaussian and when the resolution does not vary like the theoretical square root of energy.

SUMMARY

The method described herein is a methodical process that can be used to optimize the response of the nuclear detector to obtain a more Gaussian spectral shape and to obtain a Gaussian width that approaches the optimum square root of energy behavior. The method comprises the steps of scanning the crystal with a narrow-beam nuclear radiation source to determine the crystal response at different locations. The goal of the process is to render the crystal response uniform no matter where the nuclear radiation is detected in the crystal. Using the scan data, the crystal surface can then be modified to increase or decrease the crystal response in specific areas. After the specific compensation is done, the crystal response is optimized and the quality of the nuclear spectrum is improved. The same method can be used by acting on the properties of the optical reflector placed around the crystal instead or in combination with the crystal surface properties. The shape of the response and the response with energy are two critical parameters that the method disclosed herein optimizes to obtain a higher quality for nuclear spectroscopy scintillation detectors.

The invention provides a method for optimizing spectroscopy performance of a spectroscopy detector. The detector comprises at least a scintillation crystal and a photomultiplier or another means of photon detection. The method includes the steps of: a) surrounding the scintillator crystal with a reflector material, b) performing a scan measuring resolution and light output at three or more axial locations of the crystal, where at least one location is close to a PMT or below the crystal near the PMT, and at least one location is at the far end away from the PMT of the scintillator, and c) adjusting the surface finish of the crystal and/or the reflector to obtain equal light output and optimal resolution over the length and different azimuth of the crystal. Steps a through c may be repeated for best results.

Other or alternative features will become apparent from the following description, from the drawings, and from the claims.

DETAILED DESCRIPTION

In the following description, numerous details are set forth to provide an understanding of the present disclosure. However, it will be understood by those skilled in the art that the present invention may be practiced without these details and that numerous variations or modifications from the described embodiments are possible.

For efficiency, it is preferable to irradiate the crystal with a nuclear source of energy that is similar to the energy that will be detected in the final detector application. For example, $^{137}$Cs (662 keV) can be used for lower energy applications and $^{60}$Co (1173 keV and 1333 keV) and Thorium (2615 keV from the $^{208}$Tl daughter product) can be used to optimize for higher energy applications. For applications with a broader range of gamma-ray energies, a multi-energetic source can be used to probe the scintillator at different depths at the same time. A source of $^{22}$Na with two energy peaks at 511 keV, 1275 keV and a sum peak at 1786 keV is a good example. The two different gamma-ray energies effectively probe the crystal at different depths, the higher the energy, the deeper the penetration in the crystal. This way, the crystal compensation can be optimized for an entire energy range at the same time.

One goal of this method is to measure the detector response to gamma ray radiation at different points in the crystal. The first step is to map out the local crystal response. During the optimization steps, it is preferable to prepare the crystal in a manner that closely resembles its final application i.e. using a similar optical reflector, optical coupling and PMT as for the final detector package. The goal of the technique is to obtain the highest peak position (light output) and best resolution no matter which part of the crystal is irradiated and to have as little variation as possible in peak position and resolution no matter where the crystal is irradiated. This will result in optimal crystal resolution and optimal spectral shape (Gaussian) for the energy range being probed. One may start with either a polished or a rough crystal; usually it is more practical to start with an entirely polished crystal and to roughen the crystal surfaces gradually. However, it is possible to use the same method starting with rough crystal surfaces and polish them gradually.

Figure 4:
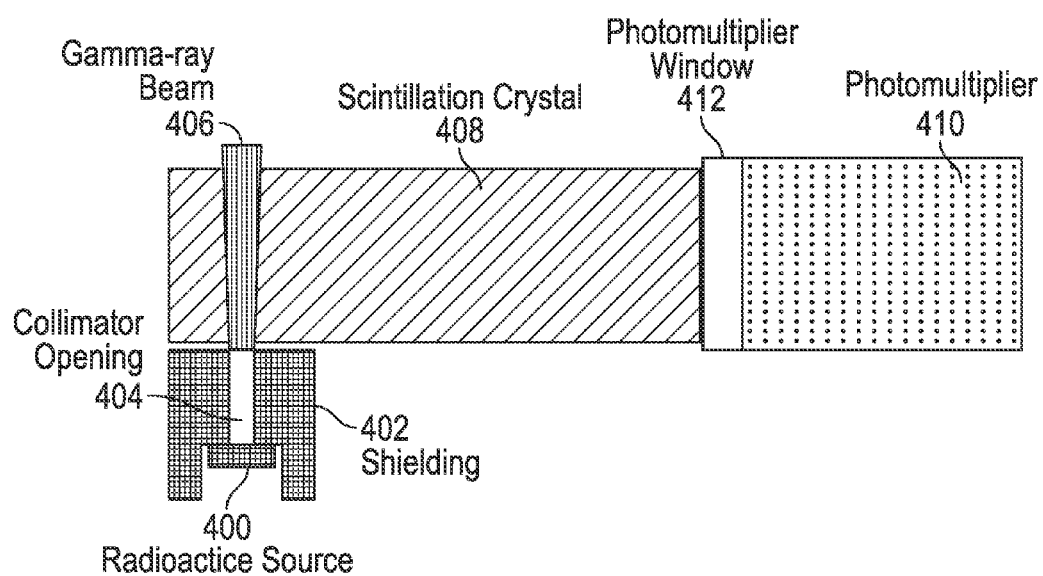
FIG. 4 shows a scintillator coupled to a photomultiplier (PMT) with collimated source to scan the crystal.
Figure 5:
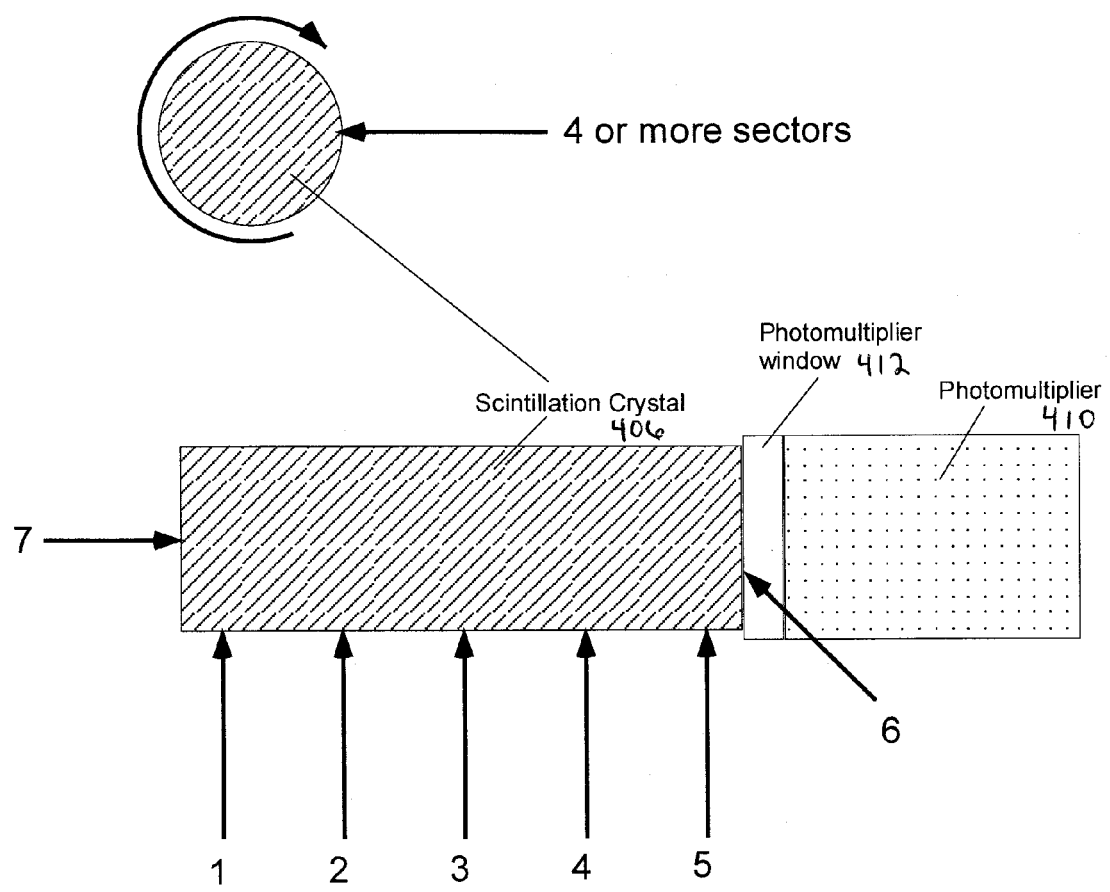
FIG. 5 shows a configuration for a scan of crystal, axial locations 1 through 5, location 6 at the bottom of the crystal near the PMT, and location 7 at the end of the crystal far from the PMT, in accordance with an embodiment of the present method.

The method includes the following steps:

1. Begin with a first best-guess crystal compensation by lightly scratching or otherwise abrading the sides and far end (away from the PMT) of the crystal.
2. Surround the crystal with an optical reflector and couple the crystal to a PMT.
3. Perform a succession of spectral acquisitions using a radioactive source or other source of radiation. The number and variety of source positions should be chosen to scan as much of the crystal as possible. For cylindrical crystals, measurements should be taken at the end of the crystal away from the PMT, at several points along the axis of the crystal (axial scan), several points around the radius of the crystal (azimuthal scan) and also at a point where the source is placed below the PMT as indicated in FIG. 5. In one embodiment of the invention this would be performed with a collimated source to limit the lateral extent of the beam as shown in FIG. 4. In an alternate implementation an uncollimated source is positioned close to the surface of the scintillator. The absence of collimation, while giving less definition will allow the use of a source of lower activity.
4. Remove the reflector to access the crystal surface.
5. The following steps may be interrupted at any time to repeat steps 2 to 4 for an updated performance scan. All steps may be repeated until the desired result is achieved.
6. The spectral acquisitions should be analyzed by looking at peak position and peak resolution. If any detector drift (i.e. change of the peak position(s) in the histogram with time) is present at this stage, it is necessary to compensate the measurements for this drift.
7. The desired result is to have similar peak position and similar and optimal resolution for all scanned points.
8. Typically, a larger amount of light can be collected in the PMT when the crystal surfaces are roughened. Using the scan data, increase the roughness of the crystal surface around positions where the peak position is lower than the average.
9. Repeat steps 6 through 9 until all the locations that measured lower than average are brought up towards the average output level. (The new average is potentially slightly increased during the process).
10. If no further improvement can be achieved by scratching the lower than average areas, the locations with higher than average peak position should now have their surface polished to bring the signal level down towards the average.
11. In a preferred embodiment the final result will be checked by repeating step 2 to 4, but instead of performing a scan, an uncollimated source is placed at a large distance from the detector so that the whole crystal is subject to uniform gamma-ray flux. The resulting acquisition should deliver a clean spectrum with (approximately) Gaussian peaks. In order to achieve a uniform irradiation, the uncollimated source should be positioned in the mid plane of the crystal. The distance of the source from the surface of the crystal should not be less than the length of the crystal.

The method applies to any solid scintillator material such as single crystals, polycrystalline material, or plastics. Examples include NaI(Tl), CsI(Na), CsI(Tl), La halides such as LaCl$_3$:Ce, LaBr$_3$:Ce and the like, LPS, GSO, BGO, LuAP:

Ce, LuAG:Pr or any plastic scintillator. In some embodiments, the scintillator material is an intrinsic scintillator that has adequate excitation and decay times without impurities added, while in other embodiments, the scintillator material requires an activator, or a bit of impurity. Thallium, sodium, cerium, and praseodymium are frequently used as activators, and are commonly reflected in the chemical make-up abbreviation as the material in parenthesis or separated by a colon. Some embodiments may also involve scintillator materials with other activators or traces of additional elements that do not substantially contribute to the scintillation properties—commonly called co-dopants—present.

The detector drift can be determined by repeatedly measuring the position of a known gamma-ray peak, e.g. the 662 keV peak of $^{137}$Cs and by ensuring that its position is stable before attempting to scan the crystal. Alternatively or additionally, the initial measurement of the scan can be repeated periodically to check that the peak position is unchanged or to adjust the gain of the PMT or amplifier to keep the peak position for one particular measurement constant.

Figure 1:
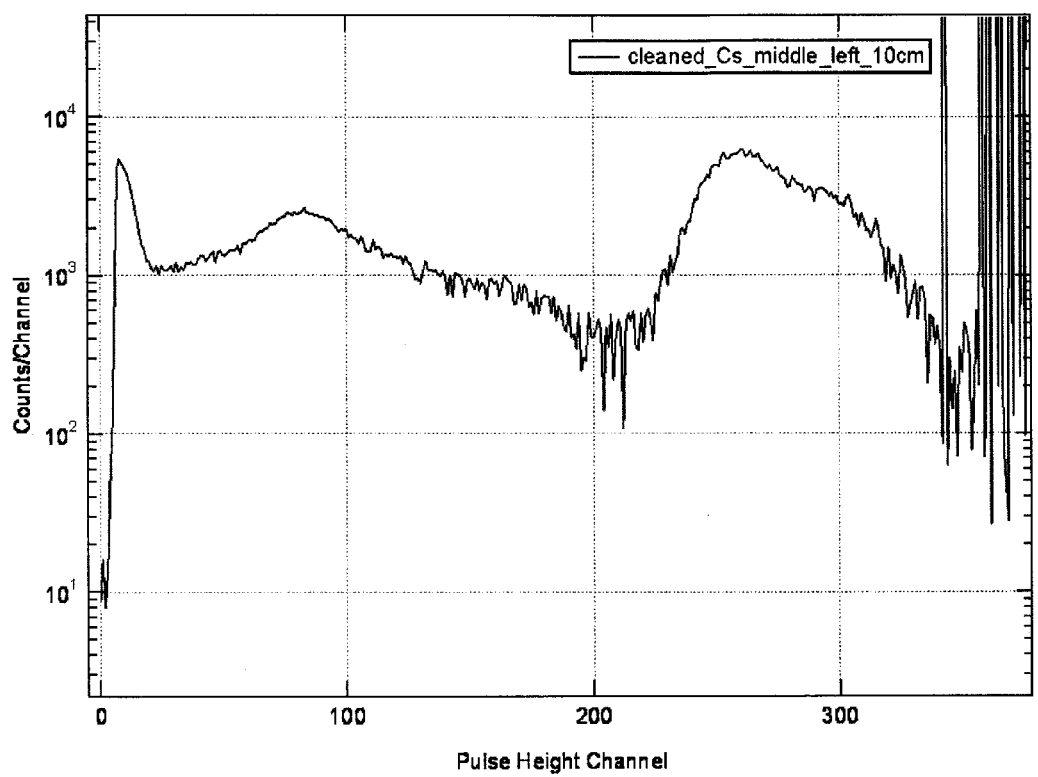
FIG. 1 shows spectral data for a crystal (before treatment) irradiated with a broad beam 662 keV $^{137}$Cs source.

FIG. 1 shows the spectral data for the crystal irradiated with a broad beam 662 keV $^{137}$Cs source before the optimization method is applied. The peak shape is not Gaussian and the resolution is very poor.

Figure 2:
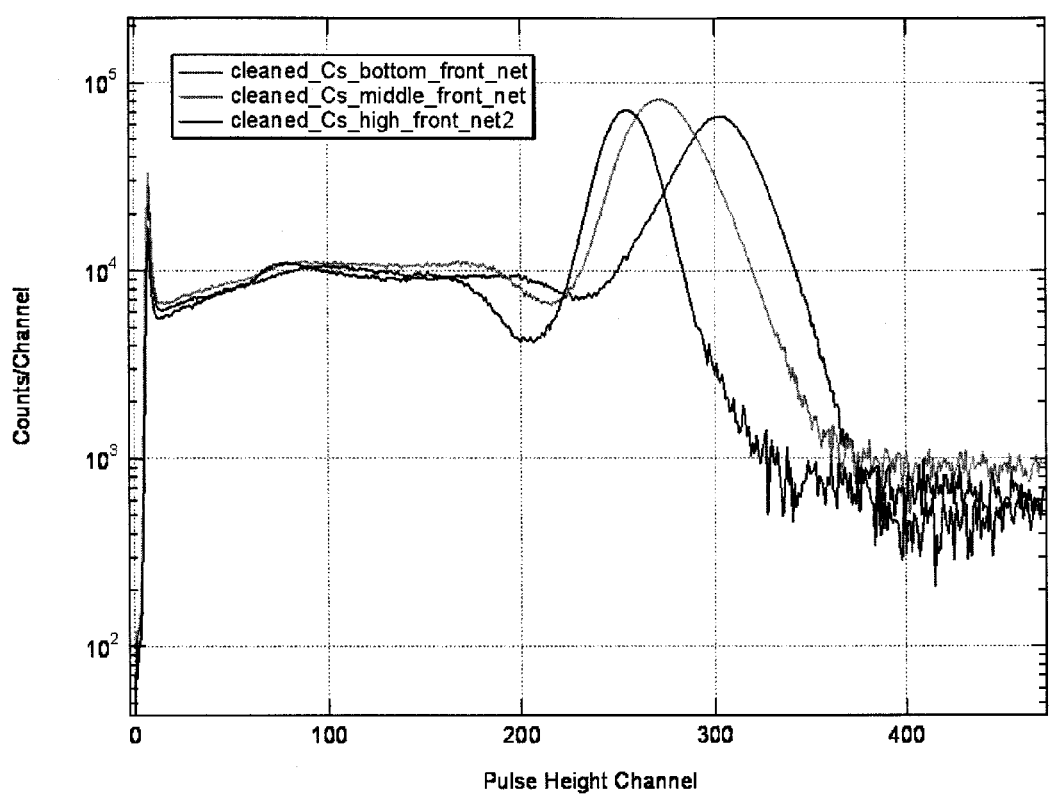
FIG. 2 is a graph overlay of the spectral response for three scanned locations for the crystal before the optimization method is applied.

FIG. 2 shows an overlay of the spectral response for three scanned locations for the crystal before the optimization method is applied. The graph shows that the peak location and shape vary greatly with the position of the radiation source relative to the crystal.

Figure 3:
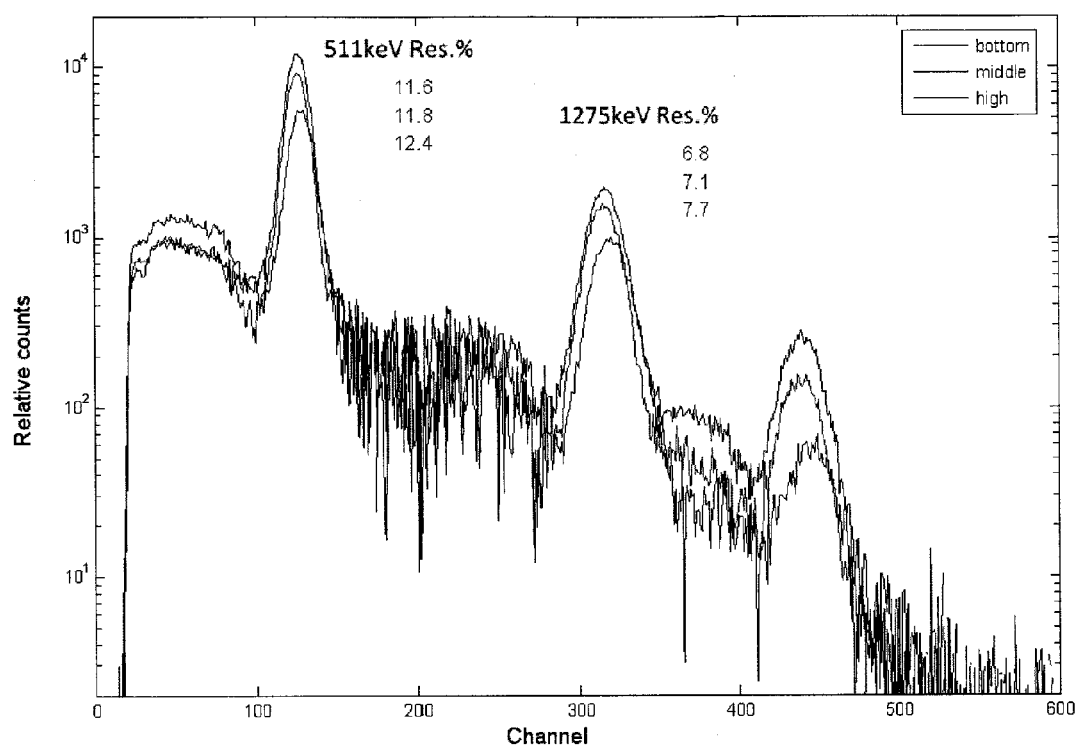
FIG. 3 is a graph overlay of the spectral response for three locations at the crystal and for the three emission energies from a $^{22}$Na source.

FIG. 3 shows an overlay of the spectral response for three locations at the crystal and for the three emission energies from a $^{22}$Na source.

FIG. 4 shows a scintillator coupled to a PMT with a collimated source to scan the crystal used in evaluating the present method. A radioactive source 400 is provided with shielding 402 disposed surrounding a collimator opening 404 whereby the gamma-ray beam 406 (i.e., the radiation emitted by the radioactive source 400) is directed into the scintillation crystal 408. The scintillator is coupled to a photomultiplier (PMT) at a photomultiplier window 412.

FIG. 5 shows a configuration for obtaining various scans of the scintillator crystal, 1 through 5 are axial scans, 6 is taken from the bottom of the crystal near the PMT and 7 scanned from the end far from the PMT, in accordance with an embodiment of the present method.

Figure 6:
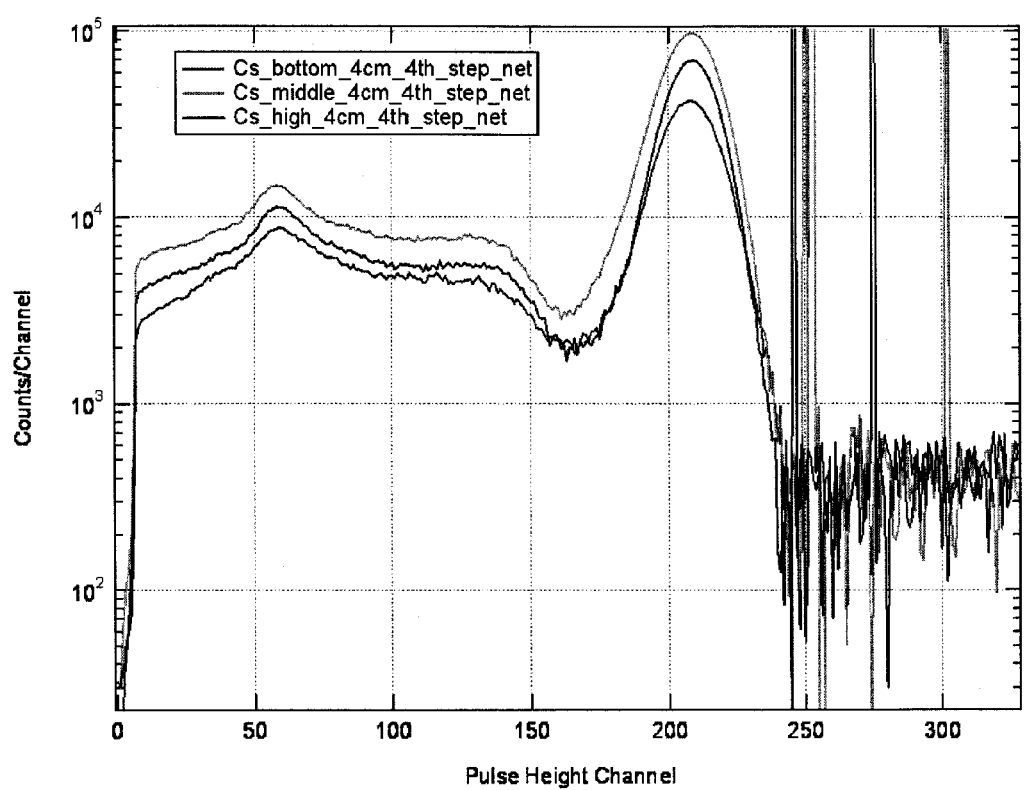
FIG. 6 is a graph overlay of the spectral response for three scanned locations for a crystal after the optimization method was applied.

FIG. 6 shows an overlay graph of the spectral response for three scanned locations for a crystal after the optimization method was applied. The graph shows that the peak location and resolution is much more consistent between positions of the radiation source relative to the crystal.

Figure 7:
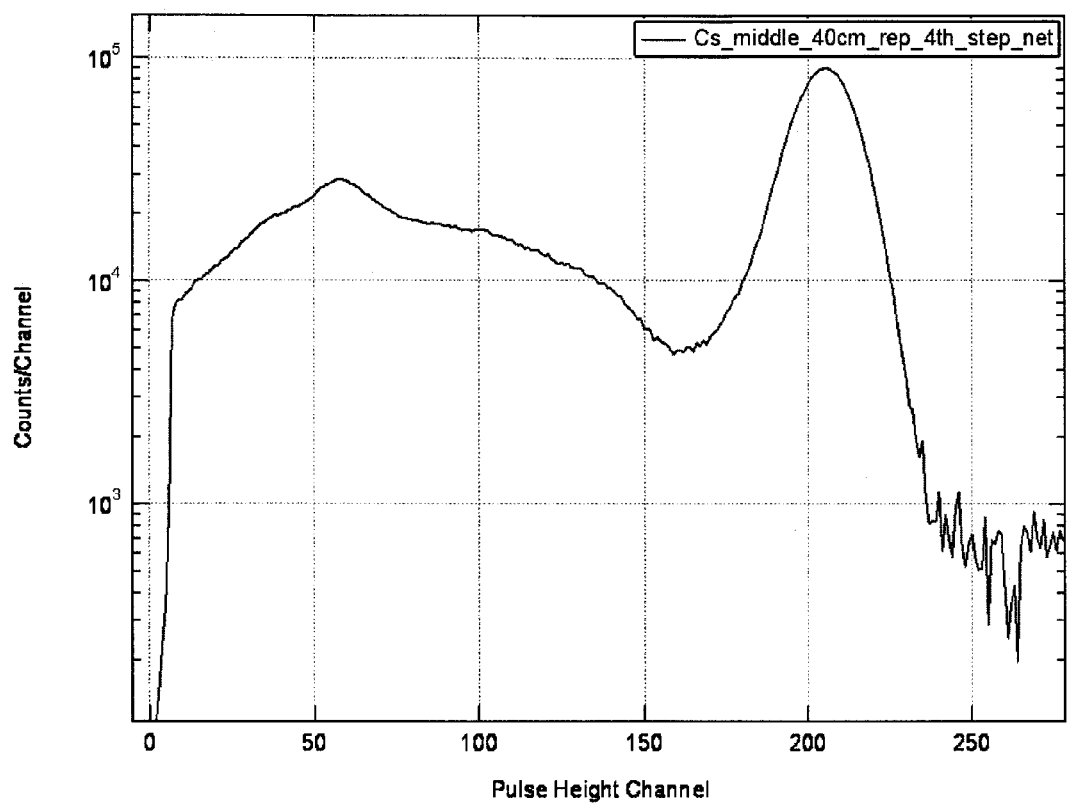
FIG. 7 is a graph of spectral data for the crystal irradiated with a broad beam 662 keV $^{137}$Cs source after the optimization method is applied.

FIG. 7 shows the spectral data for the crystal irradiated with a broad beam 662 keV Cs$^{137}$ source after the optimization method is applied. The peak shape is very close to the ideal Gaussian shape and the resolution (peak width) is much improved.

Figure 8:
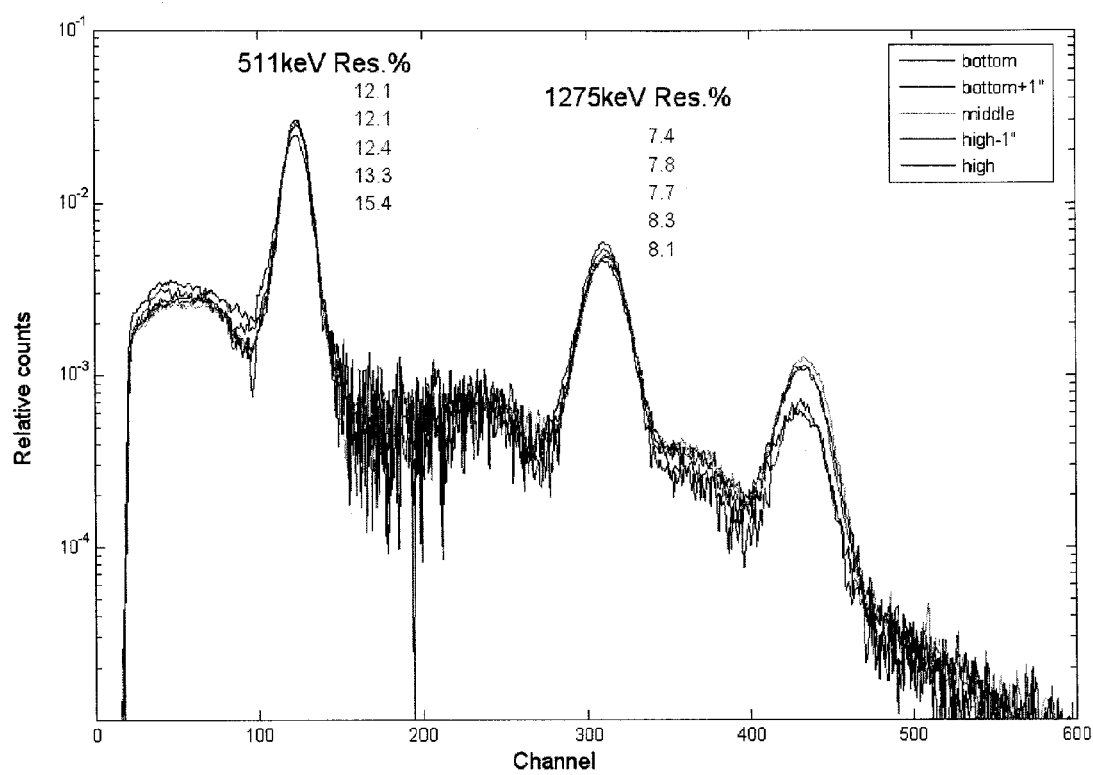
FIG. 8 is a graph of spectral data for the crystal irradiated with the multi-energetic $^{22}$Na source and for different locations after the crystal compensation was performed.

FIG. 8 shows the spectral data for the crystal irradiated with the multi-energetic $^{22}$Na source and for different locations after the optimized crystal compensation was performed. The peak shape and resolution is optimized for all energies.

Alternatively, in lieu of or in addition to changing the surface roughness of the crystal one can use reflectors with different surface properties in different axial positions of the crystal and at the end of the crystal far from the PMT. This includes, but is not limited to the use of different reflecting fluoropolymers that have a different surface roughness. Other reflectors could be white elastomers with high diffuse reflectivity, powders with high reflectivity (like $TiO_2$, $BaSO_4$), polymer foils with embedded reflective powder and also metallic foils or metal films deposited on other materials with very high reflectivity. High reflectivity materials for this application would mainly be Ag and Al.

The surface finish of the reflector may vary from one that allows near specular reflection (glossy to polished finish) to near diffuse reflection (dull finish, which limits or eliminates specular reflection). Most materials even with a dull surface finish, have some amount of specular reflection.

Reflectors intended for use in high temperature environments can be pretreated at temperature or at elevated pressures to prevent future aging of the material and deterioration in light output and compensation (as disclosed in U.S. Provisional Patent Application Ser. No. 61/179,892).

The change of roughness of the crystal can be achieved by scratching the surface with abrasive pads (for example pads of sandpaper or rough diamond) of different coarseness, using abrasion by sandblasting with a material of the proper hardness and grit size, by scratching the surface with a sharp instrument while rotating the crystal and moving it axially or by any other means that provides an axially graded surface roughness. The latter may be achieved by scratching the material with a fine tip or blade while rotating and moving the crystal in a lathe or similar apparatus. Such an apparatus can be controlled numerically to obtain a surface finish of axially varying roughness in a predictable and repeatable way. The abrasive material is preferably but not limited to one of sufficient hardness such as alumina oxide, silicon carbide, chromium oxide, diamond, etc. compared to the hardness of the scintillator material.

In yet another embodiment the surface finish can be changed through chemical edging. Variations along the axis can be obtained by masking parts of the surface or by a controlled variation in the time during which the surfaces are exposed to the etching agent.

Another embodiment for changing the surface finish is by use of plasma etching. This can also be applied locally and with axial variations.

The scintillators optimized as described above can be integrated with a photomultiplier or a similar device like an avalanche photodiode (APD), a micro-channel plate (MCP) based PMT or a silicon photomultiplier. Such a detector can be used in a downhole tool for high resolution gamma-ray spectroscopy.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method for optimizing spectroscopy performance of a spectroscopy scintillator comprising a scintillator crystal and a photomultiplier (PMT), the method comprising:
    providing a scintillator crystal with a reflector material substantially surrounding the scintillator crystal;
    irradiating the scintillator crystal with a gamma-ray source;
    performing a scan measuring resolution and light output at three or more axial locations of a body of a scintillator crystal;
    where at least a first location is within a threshold distance of the PMT and at least a second location is at an opposite end of the scintillator crystal, away from the PMT of the scintillator; and
    adjusting a surface finish of one of 1) the scintillation crystal and 2) the reflector material to obtain equal light output and optimal resolution over the length and one or more different azimuths of the scintillation crystal.

2. The method of claim 1, wherein the gamma-ray source comprises $^{137}$cs.

3. The method of claim 1, wherein the gamma-ray source comprises one selected from the group comprising $^{232}$th and daughter products of $^{232}$th.

4. The method of claim 1, wherein the gamma-ray source comprises $^{22}$na.

5. The method of claim 1, further comprising adjusting only the scintillator crystal surface finish.

6. The method of claim 1, further comprising adjusting only the reflector material.

7. The method of claim 1, wherein the scintillator material comprises one of intrinsic and activated; and wherein the scintillator material also comprises one selected from the group comprising 1) a single crystal 2) a polycrystalline material, 3) a ceramic, and 4) a plastic.

8. The method of claim 1, wherein the scintillation crystal is selected from but not limited to the group consisting of nai:tl, csi:na, csi:tl, lacl$_3$:ce, labr$_3$:ce, cebr$_3$ lps, gso:ce, bgo, luap:ce, yap:ce, luag:pr and plastic scintillator(s).

9. The method of claim 1, further comprising carrying out the steps of claim 1 in a plurality of iterations.

10. The method of claim 1, further comprising: performing adjusting using three energy peaks in a $^{22}$na gamma-ray spectrum; and performing the adjusting simultaneously or sequentially on all three peaks.

11. The method of claim 1, wherein adjusting the surface finish comprises scratching a surface of the scintillator crystal with an abrasive material.

12. The method of claim 11, wherein the abrasive material features different degrees of coarseness.

13. The method of claim 1, wherein adjusting the surface finish comprises sandblasting.

14. The method of claim 1, wherein adjusting the surface finish comprises scratching the surface with a regular, axially dependent pattern with a sharp tip.

15. The method of claim 14, further comprising controlling the scratching by a numerically controlled (nc) machine.

16. The method of claim 1, wherein adjusting the surface finish comprises applying a chemical etching process.

17. The method of claim 1, wherein adjusting the surface finish comprises applying a plasma etching process.

18. The method of claim 1, further comprising adjusting the surface finish according to a preferred orientation.

19. The method of claim 1, wherein the result of the adjusting to the surface finish comprises roughness marks approximately aligned along the crystal axis.

20. The method of claim 1, wherein the reflector material comprises a carbonfluoropolymer.

21. The method of claim 1, wherein the reflector material comprises a reflective elastomer.

22. The method of claim 1, wherein the reflector material comprises a highly reflective metal foil.

23. The method of claim 1, wherein the reflector material comprises a highly reflective metal film deposited on a plastic foil.

24. The method of claim 1, wherein the reflector material comprises a material selected from the group comprising Ag and Al.

25. The method of claim 1, further comprising providing a reflector material with lower reflectivity in a region with an above average light output.

26. The method of claim 1, further comprising providing a reflector material with higher reflectivity in a region with a below average light output.

27. The method of claim 1, further comprising thermally pretreating the reflector material.

28. The method of claim 1, further comprising pressure pretreating the reflector material.

29. The method of claim 1, further comprising applying a compensation for detector drift.

30. The method of claim 29, wherein the compensation for detector drift is determined based on use of a repeatedly measured reference position using a reference gamma-ray peak.

31. The method of claim 29, wherein the detector drift is monitored by reference to a spectral feature caused by internal activity in the detector.

32. A scintillator with optimized spectroscopy performance obtained by substantially surrounding a scintillator crystal with a reflector material, performing a scan measuring resolution and light output at three or more axial locations of the scintillator crystal, wherein at least a first location is below the scintillator crystal and at least a second location is at an opposite the end away from a photomultiplier of the scintillator, adjusting a surface finish of one of 1) the crystal and 2) the reflector to obtain equal light output and optimal resolution over the length and different azimuth of the scintillator crystal.

33. The scintillator of claim 32, wherein the scintillator with optimized spectroscopy performance is also obtained by adjusting the surface finish of both the scintillator crystal and the reflector material in a sequential fashion.

* * * * *